F. C. BURKHARDT.
AXLE HOUSING.
APPLICATION FILED JUNE 26, 1914.
1,127,399.
Patented Feb. 9, 1915.
4 SHEETS—SHEET 3.
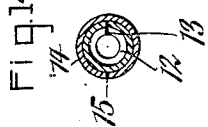
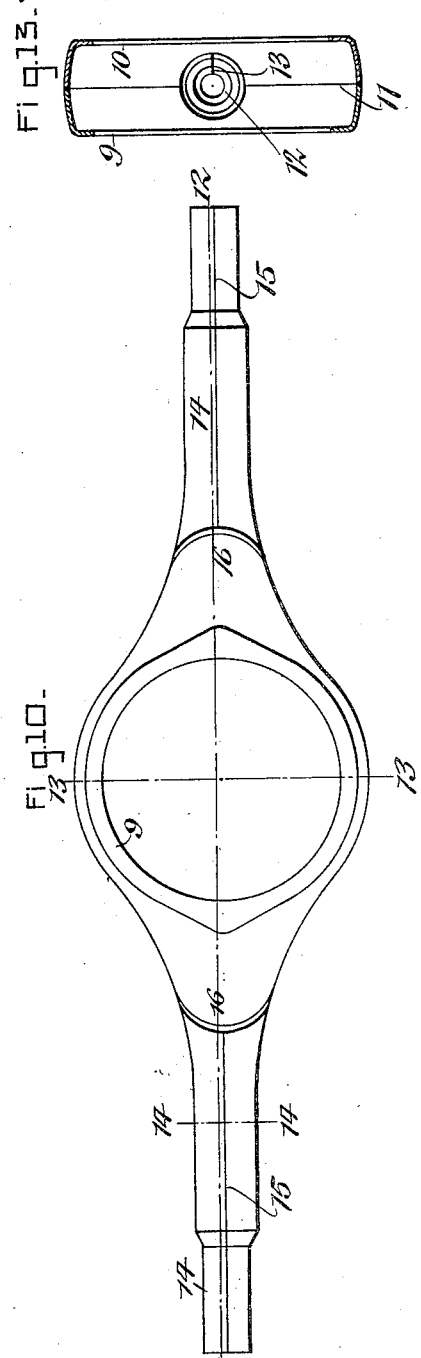
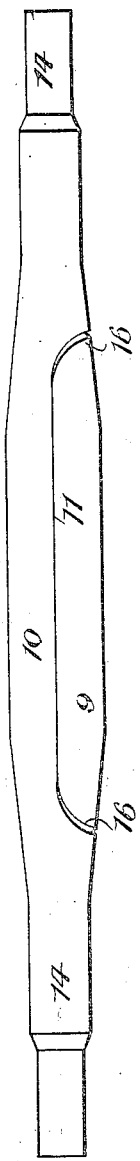
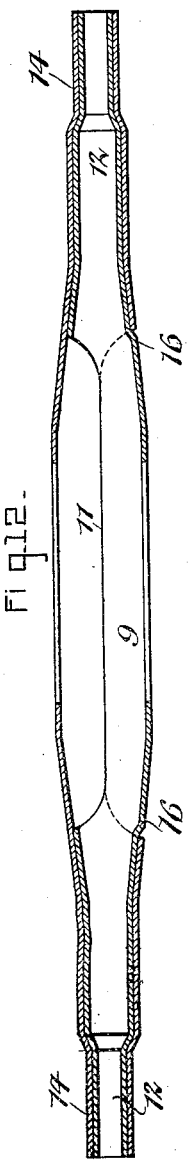
WITNESSES
Julius J. Prible
W. Ray Taylor
INVENTOR
Frederick C. Burkhardt
BY Geyer Popp
ATTORNEYS

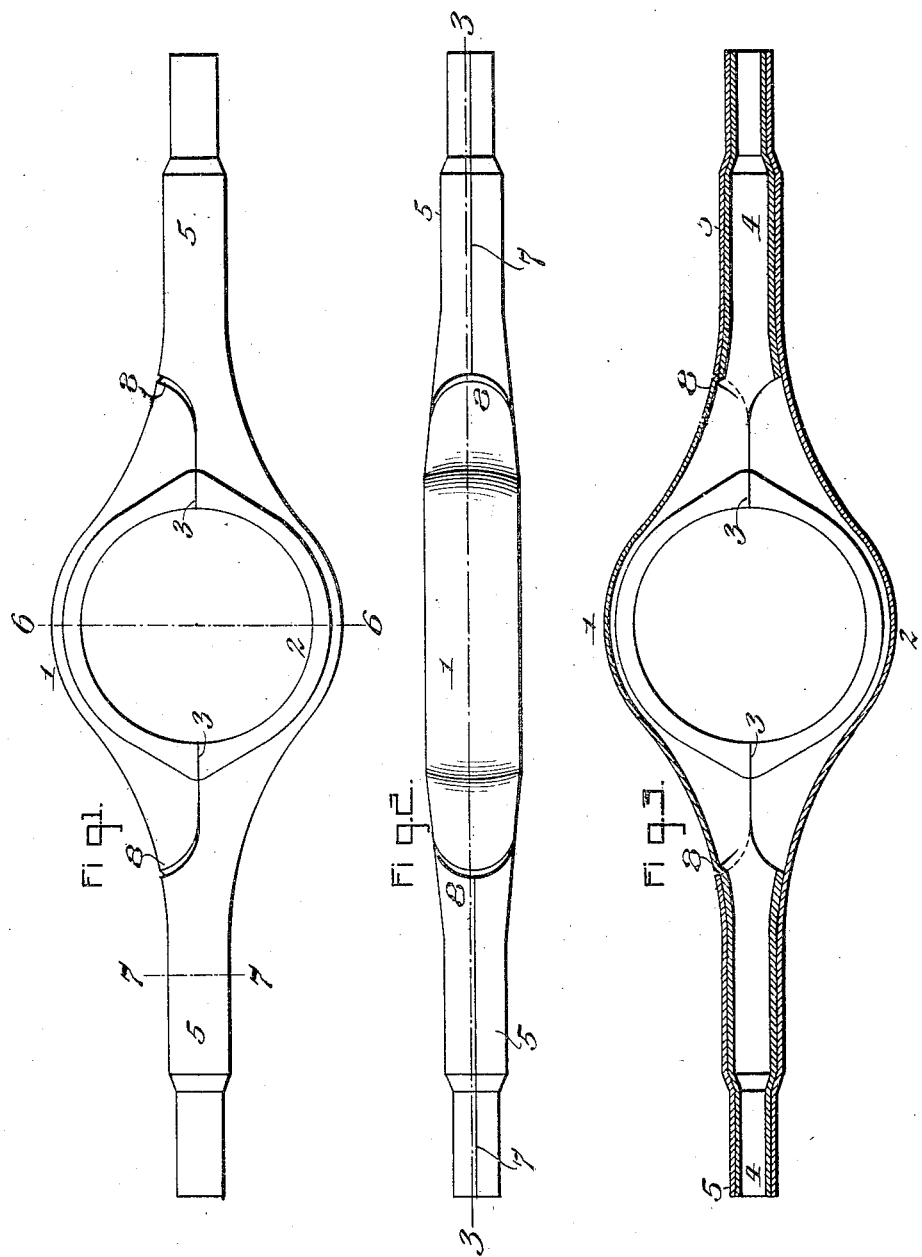

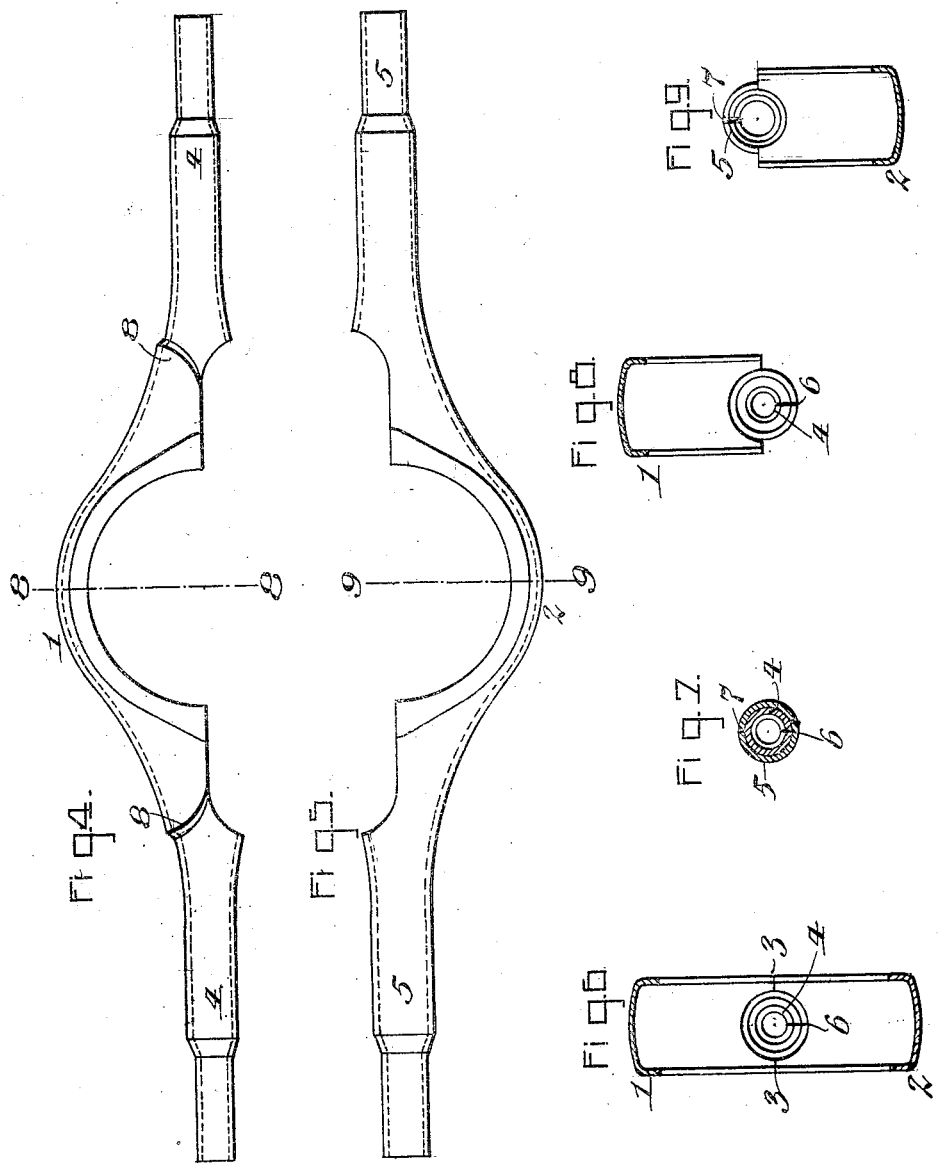

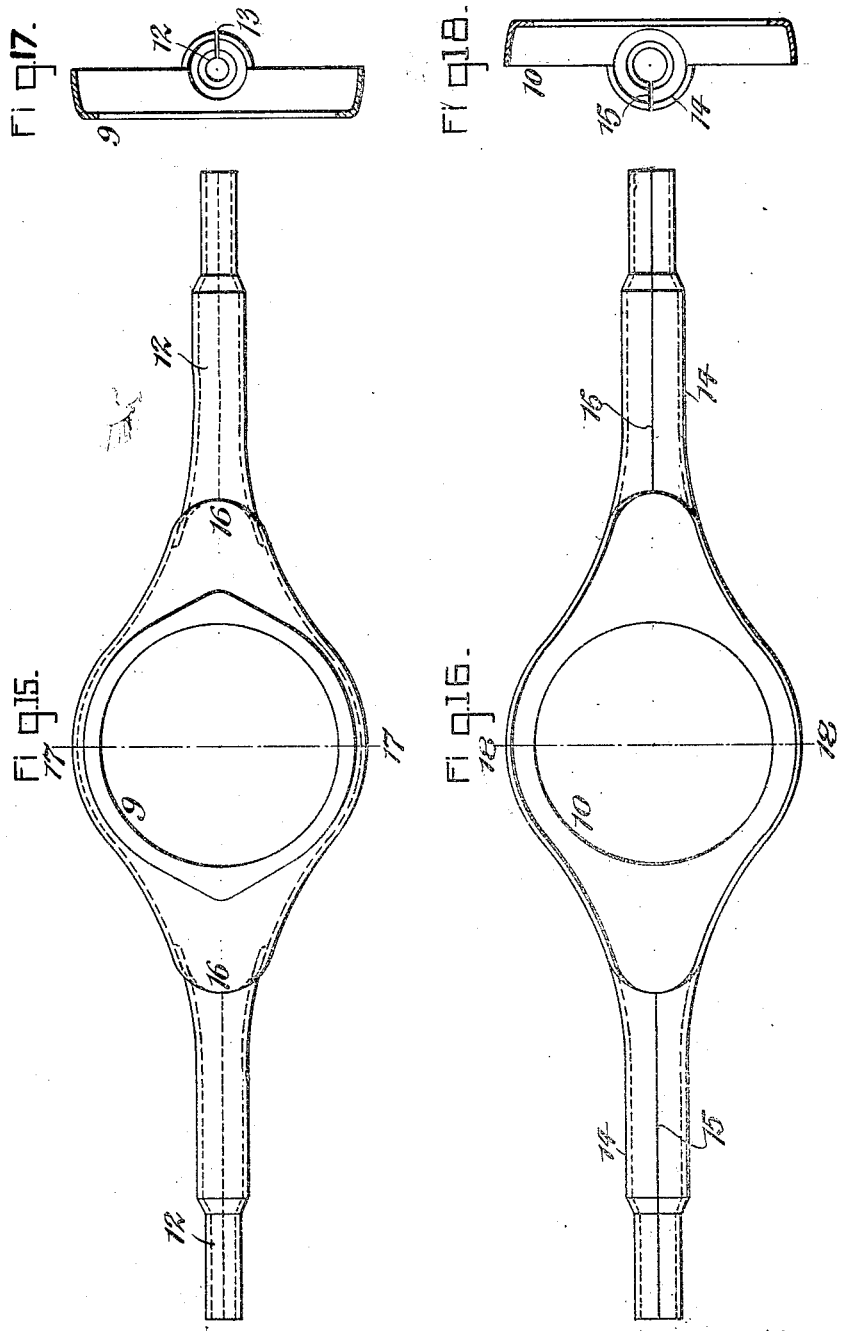

UNITED STATES PATENT OFFICE.

FREDERICK C. BURKHARDT, OF BUFFALO, NEW YORK, ASSIGNOR TO THE CROSBY COMPANY, OF BUFFALO, NEW YORK, A CORPORATION OF NEW YORK.

AXLE-HOUSING.

1,127,399.

Specification of Letters Patent.

Patented Feb. 9, 1915.

Application filed June 26, 1914. Serial No. 847,413.

*To all whom it may concern:*

Be it known that I, FREDERICK C. BURKHARDT, a citizen of the United States, residing at Buffalo, in the county of Erie and State of New York, have invented new and useful Improvements in Axle-Housings, of which the following is a specification.

This invention relates to a housing or casing which is more particularly designed for inclosing the driving axle of an automobile.

One form of axle housing heretofore in common use is stamped or bent out of sheet metal so that the central body and tubular arms are of a single thickness of metal throughout which is objectionable because the arms are liable to be bent or distorted relatively to the body under undue strains and thereby spring the arms out of alinement and cause the axle to bind the bearings of the housing in which the axle is journaled.

It is the object of this invention to produce an axle housing of sheet metal in which each tubular arm is composed of a plurality of thicknesses of metal formed integrally with the body so as to increase the strength of the arms.

In the accompanying drawings: Figure 1 is a side elevation of an axle housing embodying one form of my invention. Fig. 2 is a top plan view thereof. Fig. 3 is a vertical longitudinal section taken in line 3—3, Fig. 2. Figs. 4 and 5 are detached side elevations of the two housing sections. Figs. 6 and 7 are vertical transverse sections in the correspondingly numbered lines in Fig. 1. Figs. 8 and 9 are vertical transverse sections in the correspondingly numbered lines in Figs. 4 and 5. Fig. 10 is a side elevation showing another form of axle housing constructed in accordance with my improvement. Fig. 11 is a top plan view thereof. Fig. 12 is a horizontal section taken in line 12—12, Fig. 10. Figs. 13 and 14 are vertical transverse sections in the correspondingly numbered lines in Fig. 10. Figs. 15 and 16 are detached views of the sections forming the housing shown in Figs. 10–12. Figs. 17 and 18 are vertical transverse sections taken in the correspondingly numbered lines in Figs. 15 and 16.

Similar characters of reference indicate corresponding parts throughout the several views.

In its general organization my improved axle housing comprises two sections each of which has a central body section and tubular arm sections arranged on opposite sides of the body sections, said body sections being united to form a complete body and the arm sections of one body section surrounding those of the other body section to form complete tubular arms.

In the construction shown in Figs. 1–9 the body of the axle is composed of two substantially semi-circular body sections 1, 2, which are adapted to be joined on a horizontal diametrical line 3 so that their concave sides face each other and form a complete body of substantially circular form. At its opposite ends each of these body sections is provided with tubular arm sections which are formed integrally of sheet metal with the respective body section by stamping or bending. The tubular arm sections of one body section, for instance the upper body section, are made of comparatively small diameter, as shown at 4 in Figs. 3, 4, 6, 7 and 8, while the tubular arm sections 5 of the other or lower body section are of comparatively large diameter and surround the smaller tubular arm sections of the upper body section, as shown in Figs. 3, 6 and 7. The tubular arms are preferably arranged horizontally and axially in line with each other and the diametrical joint between the body sections, as shown in Figs. 3 and 6. The longitudinal seams of the tubular arm sections forming each arm are preferably out of line circumferentially for instance the seam 6 of the small inner arm section is on the underside of the same and the seam 7 of the large outer arm section is on the upper side of the latter, as shown in Fig. 7. In order to enable a flush or smooth joint to be made between the inner ends of the outer tubular arm sections and the adjacent ends of the body section of the other housing section this last mentioned body section is provided at its opposite ends with outwardly off-set portions 8 which fit the inner ends of large outer tubular arm sections and are flush therewith on the outer sides of these parts, as shown in Figs. 1 and 3. After the two sections of the housing have been assembled in the manner described the joints between the body sections and the respective tubular arm sections are closed or connected by any suitable means, this being preferably effected by welding in any usual and well known manner. In its completed condition this housing contains tubular arms each of which is of a double thickness of metal each thickness being integral with one half of the body whereby the strength of the housing in its arms is greatly increased without materially increasing the weight of the housing.

In the modified construction of this invention shown in Figs. 10-18 the body of the axle housing is made up of two ring shaft sections 9, 10 which are arranged axially side by side and are connected by a circumferential joint 11 between the same, as shown in Figs. 2, 3 and 4. One of these body sections, for instance the section 9, is provided on its diametrically outer sides with laterally projecting tubular arm sections 12 of comparatively small diameter formed integrally therewith of sheet metal and each having a longitudinal seam 13 on its side, while the other body section 10 is provided on its diametrically opposite sides with laterally projecting tubular arm sections 14 of larger diameter which are formed integrally of sheet metal with said last mentioned body section and each of which surrounds one of the smaller arm sections and has a seam 15 on its side diametrically opposite the seam of the companion small arm section, as shown in Figs. 4 and 5. The body section which is connected with the inner tubular arm sections is provided with outwardly projecting offsets 16 adjacent to the inner ends of the outer tubular arm sections, so as to produce a flush joint between these parts, as shown in Figs. 11 and 12. After the sections in the construction shown in Figs. 10-18 are assembled in the manner described the same may be connected by welding or otherwise in the manner suggested with reference to the construction shown in Figs. 1-9.

I claim as my invention:

1. An axle housing comprising two sections, each housing section having a central body section which is provided on its opposite sides with tubular arm sections, and the arm sections of one housing section surrounding the arm sections of the other housing section.

2. An axle housing comprising two sections, each housing section having a central body section which is provided on its opposite sides with tubular arm sections and the arm sections of one housing section being of small diameter and the arm sections of the other housing section being of larger diameter and surrounding said small arm sections.

3. An axle housing comprising a body and two tubular arms projecting laterally from opposite sides of said body, said body comprising two sections and each of said arms comprising an inner tube section connected with one of the body sections and an outer tube section connected with the other body section, said body section which is connected with the inner tube sections having outward offsets adjacent to the inner ends of said outer tube sections.

Witness my hand this 25th day of June, 1914.

FREDERICK C. BURKHARDT.

Witnesses:
 THEO. L. POPP,
 ANNA HEIGIS.